United States Patent Office 3,255,246
Patented June 7, 1966

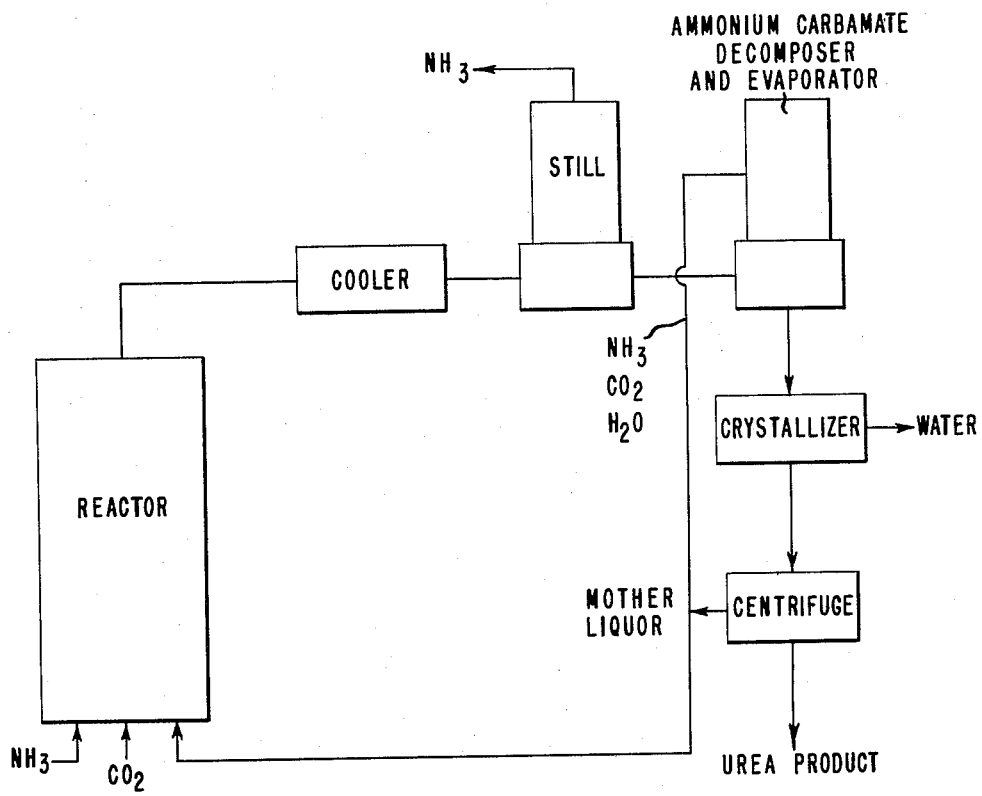

3,255,246
SYNTHESIS AND RECOVERY OF UREA
Isaac Merritt Singer, Jr., Houston, Tex., assignor to E. I. du Pont de Nemours and Company, Wilmington, Del., a corporation of Delaware
Filed June 27, 1963, Ser. No. 291,098
1 Claim. (Cl. 260—555)

This application is a continuation-in-part of my application Serial No. 5,410, filed January 29, 1960, now abandoned.

This invention relates to the manufacture of urea. It is more particularly directed to processes for making urea of low biuret content in which ammonia and carbon dioxide are reacted and the urea produced is crystallized, washed in a centrifuge, separated in said centrifuge from a biuret-containing mother liquor, and thereafter recovered while the biuret-containing mother liquor is returned to the reaction of ammonia and carbon dioxide.

It has heretofore been proposed to make urea of low biuret content by treatment of urea produced in conventional manner. Such treatment is expensive. Urea of low biuret content can be made by crystallization processes which concentrate the biuret in a purged stream containing a significant fraction of urea. Discarding this purged stream gives a large yield loss and the urea which could be recovered from it would contain a relatively high concentration of biuret.

According to my invention the mother liquid from the centrifuge stage following crystallization containing a relatively high concentration of biuret is returned to the urea synthesis chamber and urea crystal product of very low biuret content is recovered from the centrifuge stage. This makes it possible to produce crystal urea of a predetermined low biuret content with comparatively slight increase in the amount of equipment required and at the same time to produce the entire production of the plant as low biuret urea without incurring a significant yield loss.

The drawing is a semi-diagrammatic flow sheet of a process illustrating a preferred practice of the invention.

In processes of my invention the reaction of ammonia and carbon dioxide is conducted in the customary way except that it is desirable to use slightly higher temperatures and pressures than are commonly used, particularly if the ammonia content of the reactants is not increased to compensate for the addition of biuret and urea. The pressures can range from 3,000 to 6,200 pounds per square inch gauge. It is preferred to use pressures of about 5800 ±200 p.s.i.g. Temperatures can range from 190° to 220° C. but it is preferred to use temperatures around 210 ±5° C.

The urea product produced by the reaction of ammonia and carbon dioxide normally passes to a cooler, then to an ammonia separator, then to a decomposer which removes unconverted $CO_2$ and ammonia, to a crystallizer which crystallizes the urea and finally to a centrifuge where the urea crystals are washed and biuret rich mother liquor is separated and returned to the reactor. Although the diagram shows only one crystallizer and one centrifuge, the crystallization and centrifuging can be conducted in a series of stages. It is preferred to use two or more stages, each successive stage using partly virgin urea water solution. This virgin urea water solution comes directly from the main reaction stream.

The biuret-containing mother liquor from one or more of the stages is returned as feed to the reactor together with other recycled reactants such as the ammonia and carbon dioxide.

A significant economic gain is achieved by washing the urea crystals in the centrifuge to remove biuret. The wash consists of virgin urea water solution, i.e., urea water solution from which urea crystals have not been removed by crystallization from the carbon dioxide and ammonia reaction product. The virgin urea water solution will contain from .2 to .4% by weight biuret based on a urea weight basis.

The processes of the invention can be regarded also as amounting to reacting a feed of ammonia and carbon dioxide in the presence of water, biuret and urea at a pressure and temperature as above described. The proportion of the components serving as a feed to the reactor is preferably as follows:

| | Moles |
|---|---|
| $NH_3$ | 3.8 to 6.6 |
| $CO_2$ | 1 |
| $H_2O$ | 0.1 to 1.5 |
| Biuret | 0.0002 to 0.04 |
| Urea | 0.03 to 0.8 |

An example of a process of the invention is illustrated in the drawing in which ammonia and carbon dioxide are shown as entering a reactor. These enter, according to this specific example, together with ammonia and carbon dioxide recycled from the decomposer and, if desired, with the ammonia from the still which is illustrated. The product from the decomposer passes to a crystallizer which is shown in the drawing as a single crystallization step. This can instead be a series of crystallizations in customary manner. The effluent from the crystallizer passes to a centrifuge which is also shown in the drawings as a single centrifuge step. This can also be a series of centrifuges corresponding to the number of crystallizers. Mother liquor is returned from the centrifuge as feed to the reactor. The biuret-containing mother liquor can be that from all centrifuge stages or only that from later stages.

While not shown, a purge stream can be withdrawn from the mother liquor to prevent excessive impurity build-up. Again impurities can be removed in customary fashion by ion exchange or by chemical removal.

The amount of biuret normally present in processes like that shown, and without using the present invention, is of the order of 0.2 to 0.4% by weight of the urea product. It may be more or less depending upon specific operating conditions.

By using a wash as described in this invention the amount of biuret can be reduced as low as .08% by weight of the urea product.

With a biuret content of 0.38 in the feed to the crystallization step the return of mother liquor should be as follows:

| Percent of the urea product recycled to synthesis reactor | Percent biuret in recycled stream |
|---|---|
| 5 | 9.4 |
| 10 | 4.8 |

It will be evident therefore that the concentration of biuret in the recycle to the reactor will depend upon the percent of urea product recycled to the reactor.

*Example 1*

In a preferred process of the invention as illustrated the feed to the reactor was as follows:

| | Moles |
|---|---|
| $NH_3$ | 4.0 |
| $CO_2$ | 1 |
| $H_2O$ | 0.95 |
| Biuret | 0.002 |
| Urea | 0.044 |

The process was operated at a pressure of 5,800 p.s.i.g. and a temperature of 212° C. The recycle represented 7.0% by weight of the urea produced and it was recycled as mother liquor. The product obtained contained 0.08% biuret by weight in the finished crystal product as compared to 0.35% obtained when there was no return of the biuret-containing mother liquor.

The invention claimed is:

In a process for the reaction of ammonia and carbon dioxide to make urea the following steps:

(1) reacting the following:

| | Moles |
|---|---|
| $NH_3$ | 3.8 to 6.6 |
| $CO_2$ | 1 |
| $H_2O$ | 0.1 to 1.5 |
| Biuret | 0.0002 to 0.04 |
| Urea | 0.03 to 0.8 | at a pressure of 3,000 to 6,200 p.s.i.g. and a temperature of 190 to 220° C.;

(2) decomposing to remove carbon dioxide and ammonia;

(3) crystallizing urea from the resulting urea solution;

(4) washing the crystallized urea in a centrifuge with virgin urea water solution;

(5) separating the crystallized urea from the biuret enriched mother liquor in the same centrifuge;

(6) recovering the urea crystals and from the centrifuge; and (7) returning the mother liquor to the reaction of ammonia and carbon dioxide.

References Cited by the Examiner

UNITED STATES PATENTS

| 2,087,980 | 7/1937 | Lawrence | 260—555 |
| 2,848,493 | 8/1958 | Dewling et al. | 260—555 |

FOREIGN PATENTS

| 226,148 | 11/1958 | Australia. |
| 1,127,788 | 8/1958 | France. |

NICHOLAS S. RIZZO, *Primary Examiner.*

HENRY R. JILES, *Examiner.*